United States Patent [19]

Rawicz et al.

[11] Patent Number: 5,490,076

[45] Date of Patent: Feb. 6, 1996

[54] APPARATUS AND METHOD FOR AUTONAVIGATION WITH ONE OR MORE ORBITING SATELLITES AND AN ANCHOR STATION

[75] Inventors: Harris C. Rawicz, Bridgewater; Laurence J. Doyle, Hazlet; Peter M. Brodie, Oakland, all of N.J.

[73] Assignee: ITT Corporation, New York, N.Y.

[21] Appl. No.: 304,360

[22] Filed: Sep. 12, 1994

[51] Int. Cl.[6] .................... G06F 165/00; H04B 10/105
[52] U.S. Cl. .................... 364/459; 364/449; 364/460; 342/358; 455/98
[58] Field of Search .................... 364/449, 459, 364/458, 460; 342/357, 457, 358; 455/98; 244/158 R, 165, 169

[56] References Cited

U.S. PATENT DOCUMENTS

| | | | |
|---|---|---|---|
| 4,494,211 | 1/1985 | Schwartz | 364/571 |
| 4,918,609 | 4/1990 | Yamawaki | 364/449 |
| 5,160,935 | 11/1992 | Inamiya | 342/357 |
| 5,187,805 | 2/1993 | Bertiger et al. | 455/12.1 |
| 5,267,167 | 11/1993 | Glickman | 364/459 |
| 5,311,194 | 5/1994 | Brown | 342/357 |

OTHER PUBLICATIONS

An Autodop Algorithm for the Block IIR Autonav Capability: by Alison Brown, Institute of Navigation Satellite Division Technical Meeting 2D, Sep. 27–29, 1989 Colorado Springs, CO, pp. 291–293, Publisher: Washington, DC, Institute of Navigation.

Sensitivity Analysis of an Integrated Navstar GPS/INS Navigation System to Component Failure by H. M. Schwartz, The Journal of Navigation vol. 30 No. 4 pp. 325–337, Winter 1983–1984, Publisher: Royal Institute of Navigation.

*Primary Examiner*—Michael Zanelli
*Attorney, Agent, or Firm*—Arthur L. Plevy; Patrick M. Hogan

[57] ABSTRACT

A system of making satellite-to-ground range measurements, carrying out communications between a ground station and a constellation of autonavigating satellites, and using these range measurements to improve navigation accuracy is disclosed. The system comprises an anchor that is in a fixed position relative to the earth. The anchor implements a filtering algorithm to arrive at solutions for the satellites' positions based on measured satellite positions and predicted satellite positions. Each time a new measurement is received by the anchor an update is generated. In this manner the system is capable of updating satellite positions at a greater rate than similar prior art systems, thereby, decreasing the transient response associated with satellite delta-v maneuvers and decreasing the quantity of data that must be exchanged by the anchor and the satellites.

23 Claims, 6 Drawing Sheets

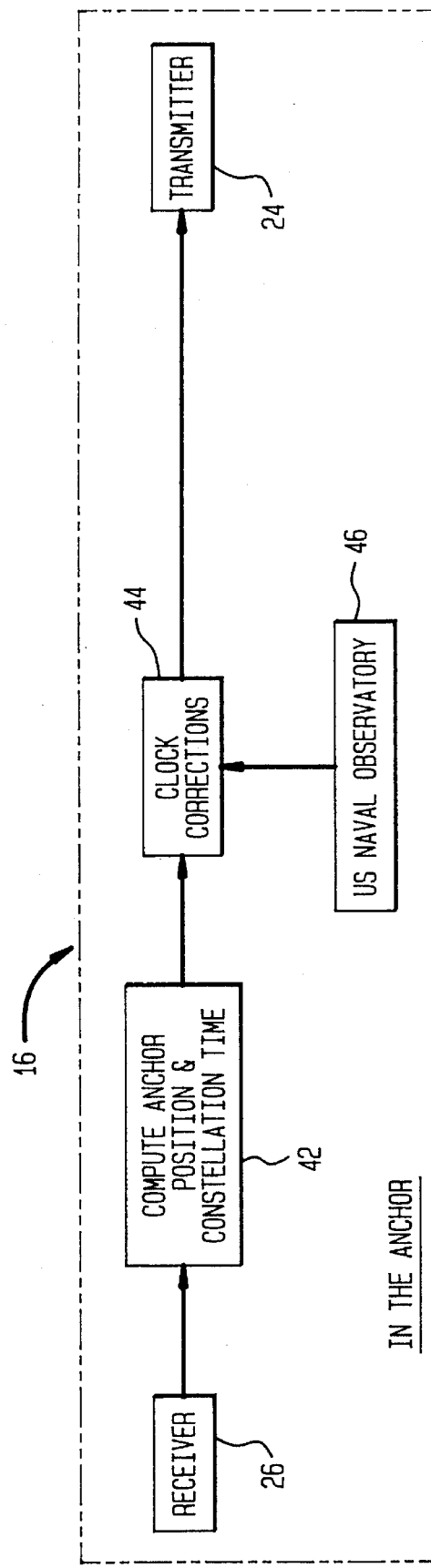

APPARATUS AND METHOD FOR AUTONAVIGATION WITH ONE OR MORE ORBITING SATELLITES AND AN ANCHOR STATION

FIELD OF THE INVENTION

This invention relates to communications between one or more earth-orbiting satellites and a station of fixed position relative to the earth, and more particularly to the exchange of navigational and clock data between a constellation of earth orbiting satellites and a station of fixed relative position relative to the earth in a manner which minimizes a satellite's dependence on a ground control and monitoring station.

BACKGROUND OF THE INVENTION

In the art of earth-orbiting satellites it is known to establish a communication link between an orbiting satellite and an earth monitoring and control station, or "control segment". Such a communication link may be used for downloading information which is critical to the monitoring of the satellite performance and for uploading commands necessary for the proper performance, and to correct defects in that performance. The determination of satellite commands usually requires extensive dam analysis utilizing complex computer programs, which is labor intensive. In systems which require that the satellite computer predict accurate current and future position with respect to the earth, a significant part of the control segment data analysis is used to determine the position prediction parameters to send to the satellite, and a significant portion of the total control segment transmission of data to the satellite is allocated the transmission of these position prediction parameters. The anchor concept uses a combination of computations performed on the satellites and a fixed satellite or simulated satellite of known position with respect to the Earth to anchor the constellation and significantly reduce control segment work load.

The anchor concept may be applied in systems requiring the satellite computer to predict accurate current position with respect to the earth. For example, the anchor concept may be applied in systems requiring the exchange of navigational and clock data between a constellation of earth-orbiting satellites and a control segment located on the earth surface. Application of the anchor concept in this type of system affords the advantage of a stable coordinate reference with significant reductions in the data analysis, the accompanying man hours, and in the data transmission up to the satellite, thereby significantly reducing the control segment work load.

The orbital path of the satellite is known, either from data from the control segment, or from the exchange of navigational and clock data in a constellation of satellites with processing similar to that known as autonavigation "AUTONAV" on the GPS global positioning satellite system). Since the anchor's position is fixed and known relative to the earth's surface, a prediction of the relative positions of the satellite to the anchor and of the satellite to the earth's surface can be made. This can be readily accomplished without the need for human intervention. System integrity is also improved by reducing the amount of data transmitted to the satellite with its inherent chance of error and the chance of human error. The result is a significant reduction of system life cycle cost.

The anchor's fixed position relative to the earth makes it possible to accurately compute the position of an orbiting satellite relative to the anchor. This is particularly important in satellite systems that cannot function properly without knowledge of satellite position relative to the earth's surface. Typical of such a system would be any communication network that proposes to provide global point-to-point coverage through the use of earth-orbiting satellites. In order for such a system to be operable, it must be capable of determining if the satellite selected to relay the communication is "visible" to both points on the earth, or if a satellite-to-satellite relay is required because the source and the destination are not visible from the same satellite. The visibility of the satellite to any point on the earth is a function of the position of the point, the position of the satellite, and the beamwidth of the satellite's antenna. Since the position of a point on the earth's surface and the beamwidth of the satellite's antenna are known, the only remaining unknown necessary to a visibility determination is the satellite position. The anchor provides a way to determine this satellite position.

The use of an anchor to determine the position of a global communication satellite with respect to the earth is one example of how the anchor concept may be applied. Another example of the anchor's utility is found in its application to global navigation systems.

The preeminent global navigation system in use today is the Global Positioning System (GPS). The GPS is composed of a plurality of satellites orbiting at approximately 11,000 nautical miles above the earth and maintained in almost perfectly circular orbits. These orbits are chosen so that the system can provide information to a user regardless of the time that the user requests information and regardless of the user's position on the earth's surface. A user of the GPS determines his latitude, longitude, and altitude by employing a GPS receiver. The GPS receiver engages in a radio-ranging calculation with the GPS satellites and then employs a three dimensional equivalent of the traditional "triangulation" technique on the data it receives from the satellites to compute the user's position. In order to use this "triangular" technique, four of the orbiting GPS satellites must be "visible" to the user at any one time. Also, the position of these four satellites relative to the earth must be known—the greater the accuracy of the reported satellite position, the greater the accuracy in the user position determination. Therefore, a stable and precise reference that can provide for an accurate determination of satellite positions relative to the earth's surface is a critical element of the GPS. Without it, the GPS could not carry out its primary task of providing users with accurate position information. Currently, this reference is supplied manually by the Control Segment.

The method used to compute the range to a GPS satellite involves the transmission by each satellite of encoded pulses of electromagnetic energy. The pulses will be incident upon the GPS receiver after a delay that is proportional to the distance from the satellite to the receiver. The pulses are then decoded by the receiver to determine the identity of the transmitting satellite, the time of transmission, and the position of the satellite at the time of transmission. When four such pulse sequences are transmitted closely in time, one by each of four different satellites, the receiver can calculate the average GPS Time and its range to each of the four satellites at the time of transmission and, from those ranges and the known position of the satellites, it may then calculate its position relative to the earth.

For the GPS ranging method to yield an accurate determination of satellite-to-receiver range, the timing reference aboard each satellite must be in synchronization with the receiver time reference. The satellite time references are synchronized by the use of the "AUTONAV" process in GPS block IIR, which is well known to those knowledgeable in GPS technology. Once the satellite time references and receiver time reference are locked to a standard time reference, and the use of the fourth satellite ranging pulse sequences allow the GPS receiver to synchronize, accurate range measurements may be achieved.

The anchor provides a way to synchronize the satellite time reference, called "GPS time", to an earth standard time reference known as UT1. In addition, since the range to the satellite is measured and the position of the anchor is known, the information necessary for the satellite to determine the difference between the measured range and the estimated range is used as a measurement in the satellite to correct the satellite's estimate of its current trajectory parameters.

In addition to the anchor's GPS functions of determining satellite position and monitoring the satellite timing references, another important anchor function is that of maintaining the GPS satellites in their proper orbits. Any deviation of a satellite from its prescribed orbit will adversely affect the accuracy of predictions of that satellite's position, and in the extreme case could result in the loss of the satellite. For these reasons it is important to detect errors in the satellite's orbit and correct them when necessary. The anchor may be used to sense errors in the satellite's orbit and to issue change of position, or "delta-v", velocity correction commands to re-position the satellites, or it could be used to check a control segment delta-v command to improve integrity.

Maintenance of the satellite's orbits requires that the control segment accurately track the position of the satellites before, during, and after the implementation of a delta-v command. In the current GPS configuration, this tracking function is carried out through the use of a Kalman Filtering Algorithm.

In a Kalman Filtering Algorithm, a Kalman Filter or mathematical filter/predictor is provided with satellite position as reported from two different sources, from which the filter generates a satellite position determination that is more accurate than could be achieved by either source individually. One of the filter's sources provides updated predictions of the satellite positions as determined by a mathematical model of the satellite orbit. The second source provides updated satellite position data as communicated from the satellites themselves, i.e., each satellite's position as computed by its internal tracking mechanism. After receiving information from the two sources, the Kalman Filter computes a new position determination based on a weighted average of the received information. In this manner the Kalman Algorithm can operate to minimize the mean-squared error among the satellite position determinations. A detailed description of how a Kalman Algorithm minimizes the mean-squared error inherent in tracking a set of data can be found in "Radar Handbook", edited by Merrill Skolnik, 2d edition, published by McGraw Hill, Inc. (1990) (see Chapter 8, entitled "Automatic Detection, Tracking, and Sensor Integration" by G. V. Trunk). Also, in the article entitled "Sensitivity Analysis of an Integrated NAVSTAR GPS/INS Navigation System to Component Failure" by H. M. Schwartz, published in Journal of the Institute of Navigation, Vol. 30, No. 4, winter 1983–1984, pp. 325–337, two examples are given of how position coordinates originating from various sources are mixed by means of a Kalman Filter so as to generate one system of position coordinates, the accuracy of which is substantially greater than that of the individually presented position coordinates.

The Kalman Filter solution for position determination will, in most instances, represent the best available solution for position and orbit of the satellites. However, it may diverge from the correct solution in some cases. The Filter requires an initial estimate of the satellite positions to become operational. These initial estimates give rise to a filter transient response. Accordingly, the Kalman Filter solution may fluctuate widely during initial operation, and then converge on the correct solution for satellite position as the period of transient response decays. A similar transient response results whenever the "initial" estimates are changed, such as when a delta-v maneuver is executed. Following a delta-v maneuver, the Filter is reinitialized, thereby causing a transient response and rendering the GPS constellation unstable for the period of the response. Moreover, if presented with bad initialization data, the Kalman Filter solution may diverge entirely from the correct solution.

Once the control segment has arrived at a viable Kalman Filter solution, it must communicate the solution to the satellites so that the satellites may, in turn, pass on accurate positional data to GPS users. The operation of uploading current satellite data and downloading satellite information takes about 20 minutes. These operations can only be performed during the period in which the satellite being communicated with is visible to the control segment—a minimum period of about one hour per pass is required for each satellite. Since the required communications take about 20 minutes, and another 20 minutes is required for safety retransmission, this leaves only 20 minutes left for establishing communications. The limited period for establishing communications can present a problem, particularly when operational and transmission errors occur. If the required communications can not be completed in a visibility period, the satellite and control segment must function on old data, a situation which results in an overall decrease in positional accuracy.

Further complicating the satellite-control segment communications is the quantity of data that must be transmitted. In addition to uploading current satellite position, a prediction of future satellite position is uploaded. The position of a current GPS or a block IIA satellite is predicted for a period of 14 days into the future. In this manner, the satellite will be able to use predicted positional data in lieu of actual positional data from the control segment, thus keeping the satellite operational despite any loss of the control segment. The 14 days corresponds to the maximum amount of time that the satellite will be able to remain operational following an event that results in the loss of communications from the control segment. Of course the use of predicted data introduces an additional source of error into the system, and thereby results in less accurate user data during periods of control segment unavailability.

Efforts have been made to reduce the satellites' dependence on the control segment. Most notably, the newer generation of satellites, or "GPS block IIR" satellites have been provided with an autonomous navigation capability, or "autonav" and a prediction time of 210 days instead of 14 days.

To autonomously navigate, each of the GPS block IIR satellites implements its own Kalman procedure. At periodic intervals, each block IIR satellite broadcasts its clock value, ephemerous data, and Kalman Filter data—collectively known as the "autonomous navigation message". This data is used by all receiving satellites to update their own Kalman procedures. In order for satellites to broadcast and receive data among themselves they are equipped with transmitters and receivers dedicated to that purpose, collectively known as the satellite "crosslinks". All block IIR satellites that are in view of the broadcasting satellite's antenna will receive broadcasted data. A broadcast period is defined, and each satellite broadcasts during an assigned portion of that period. Thus, the identity of broadcasting satellite can be determined by any receiving satellite merely by noting the time of broadcast, although this is not the only method of determining the broadcasting satellite. This method of determining a broadcasting satellite's identity is sometimes referred to as "Time Division Multiplexing" (TDM). The range between satellites is computed by noting the elapsed time between transmission by the broadcasting satellite and reception by the receiving satellite and then multiplying that time by the speed of propagation, nominally the speed of light. Currently, through crosslink communication, block IIR satellites can maintain highly accurate determinations of their position relative to one another; however, determinations of their position relative to the surface of the earth are still subject to the limitation associated with control segment processing. For a more in depth discussion of the basic design and functions of the GPS block IIR satellites and their autonomous navigation function see: "An AUTODOP Algorithm for the Block IIR Autonav Capability" by Alison Brown, Institute of Navigation Satellite Division, Technical Meeting, 2d, Colorado Springs, Colo., September 27–29, Proceedings, Washington, D.C., Institute of Navigation, 1989, pp. 291–293.

The crosslink communication between satellites and the communication between a satellite and the control segment are illustrated in FIGS. 1 and 2. In FIG. 1 the communication between a broadcasting satellite 2 and two satellites 4 and 6 that are visible to the broadcasting satellite antenna is shown. Also shown in FIG. 1 is the communication between a satellite 2 and a control segment 8. In the current GPS configuration, satellite to control segment transmissions are accomplished using both S and L band radio frequencies while control segment to satellite communications are accomplished using S-band radio frequencies. FIG. 2 is a depiction of how clock value, ephemerous data, and Kalman Filter data is "indirectly communicated" from a broadcasting satellite 10 to an invisible satellite 12. In FIG. 2 a third satellite 14 receives data from the broadcasting satellite 10. This data is used by the third satellite 14 to update its clock, ephemerous data, and Kalman Filter data. Thus, when the third satellite 14 broadcasts, it is "indirectly communicating" the broadcasting, processed satellite 10 data to the invisible satellite 12. The communication between satellites 10, 12 and 14 occurs regardless of whether the control segment 8 is visible to the satellites.

As noted above, each block IIR satellite has an on-board Kalman Filter that the satellite uses to generate a solution for the satellite positions. Using these Filters in conjunction with periodic receptions of data from the other satellites, each satellite can maintain an accurate fix on this position relative to all other satellites, but communication with the control segment is still necessary in order for the satellite to maintain a fix of their positions relative to the surface of the earth, as well as to update ephemerous prediction data. Through the use of autonav, control segment—satellite communications can be made less frequently without a dropoff in the accuracy of satellite position relative to the earth's surface. Thus, in the event that the control segment can not be communicated with (e.g. it has been damaged or destroyed by an act of nature or war), the block IIR satellites can continue to operate within a specified error tolerance for a longer period of time than non-autonav satellites under the same circumstances. This characteristic of the block IIR satellites maintains block IIR operation for a 210 day period of control segment unavailability.

A further advantage of autonav is the small time constant of the block IIR Kalman Filters as compared to the time constant of the control segment Kalman Filter. Because of their smaller time constant and faster sampling, the block IIR Kalman Filters can respond more quickly to velocity changes or delta-v maneuvers. The quicker response reduces the transient response caused by a delta-v maneuver and, in turn, reduces the period of unavailability that follows such maneuvers.

It is one object of the present invention to enhance the performance of the GPS by reducing the current GPS control segment workload using an "autonavigation anchor"—that is, a portion of the control segment that communicates with the block IIR satellites in essentially the same manner that those satellites communicate with each other.

An autonavigation anchor will broadcast and receive data similar to autonav the way a block IIR satellite does. While the anchor may be located on the earth's surface, such location is not essential. Any position that is known relative to the earth's surface will suffice. For example, the anchor may take the form of a geosynchronous satellite. In an autonavigation anchor system, the block IIR satellites will know their position relative to the earth's surface because they know their positions relative to all autonav satellites, and the anchor would be, in effect, another autonav satellite, albeit in a known position relative to the earth's surface. Also, the large transient response of the control segment Kalman Filter will be eliminated. Delta-v maneuvers would give rise to the smaller autonav transient response due to the faster sampling rate, thereby decreasing the amount of time that the system is unavailable.

Furthermore, use of an autonavigating anchor will reduce the error associated with limited control segment—satellite visibility (update rate). This follows from the ability of autonav equipped units to "indirectly communicate". By placing the anchor in the autonav "chain", the anchor will receive processed data from invisible satellites through visible satellites.

Moreover, an autonavigation anchor can be used to relay earth standard time referenced corrections to the satellites. Such a reference correction could be relayed to the anchor from an external source located on the earth and then broadcast to the orbiting satellites as part of the anchor's normal autonav message, for example, as a correction of the anchor's own internal determination of the constellation clock value.

By using an autonavigation anchor to perform the clock and position correction normally performed by the control segment, the foregoing advantages may be realized. The advantages will result in superior system performance at a reduced cost and labor associated with operating the GPS, or any other satellite system requiring communication with one or more orbiting satellites.

When the autonavigation anchor is located on the surface of the earth the range error satellite used in its Kalman Filter may be coordinate converted to a measured error which seems to come from a geostationary satellite located above the earth located autonavigation anchor at the mean radius of the constellation. This improves the reaction time of the constellation with respect to a constellation "drift" from estimated position.

SUMMARY OF THE INVENTION

It is an object of this invention to provide a ground station capable of making satellite-to-ground range measurements with the capability of autonomously navigating satellites using these measurements to improve the accuracy of their orbit estimates relative to the earth. After the navigation process on board each satellite has been initialized, no other data from the ground is required by the satellites for the purpose of navigation, except for these measurements. By using an autonavigation anchor to perform these tasks, the reliability of the anchor-satellite system will be increased while both the cost associated with the system and the labor necessary to operate the system will be reduced.

This object of the invention is achieved by making use of intra-satellite communication link structure, or "crosslinks". The anchor is equipped with a transceiver and communicates with satellites almost as though it were another orbiting satellite, despite its fixed position relative to the earth. By using the crosslink structure to relay information between the anchor and the orbiting satellites, the anchor's functions can be implemented more efficiently. A vivid illustration of how the anchor's operation is enhanced by the present invention can be seen in the application of the invention to the Global Positioning System (GPS).

In a preferred embodiment of the invention, a portion of the current GPS control segment is replaced with an anchor that utilizes crosslink type communications. Using the crosslink capability, the anchor communicates with the orbiting GPS satellites in a similar manner that those orbiting satellites communicate with each other during their exchange of autonav data. This type of "autonavigation anchor" reduces the GPS's dependence on the control segment and makes the system more responsive to corrections in a satellite's orbit. Thus, there is longer, more accurate GPS operation in the event of a control segment failure and less GPS instability following a delta-v maneuver. Accordingly, the expenditures of resources that would otherwise be required to deal with such contingencies is reduced or eliminated.

BRIEF DESCRIPTION OF THE DRAWINGS

FIG. 3B is a block diagram of the invention showing the elements of the invention that are part of the orbiting satellite(s);

DETAILED DESCRIPTION

Figure 1:
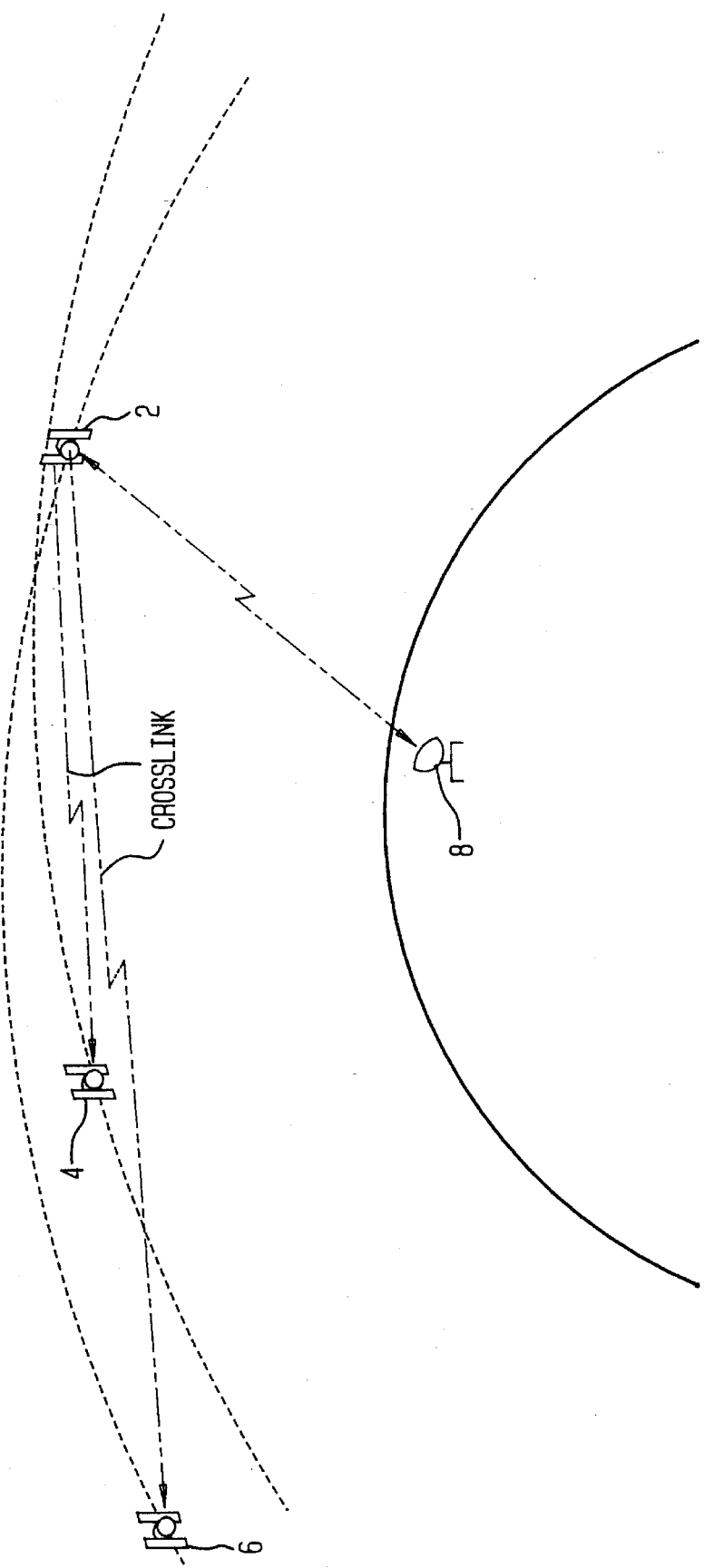
FIG. 1 is a plan view of a system of earth-orbiting satellites, showing orbiting satellites, the earth, and an anchor.
Figure 2:
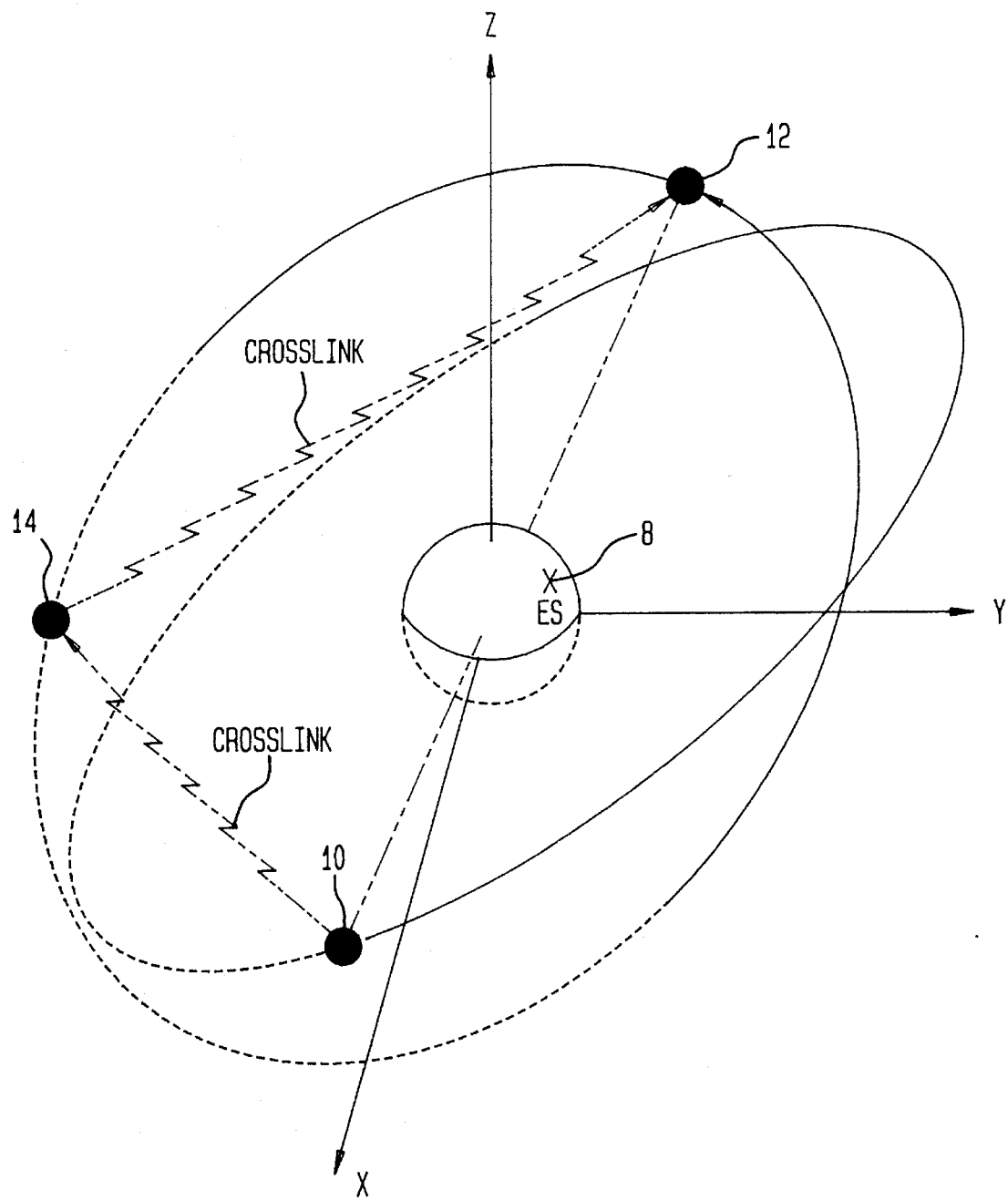
FIG. 2 is a plan view of a system of earth-orbiting satellites, showing a plurality of communication links between satellites.
Figure 3A:
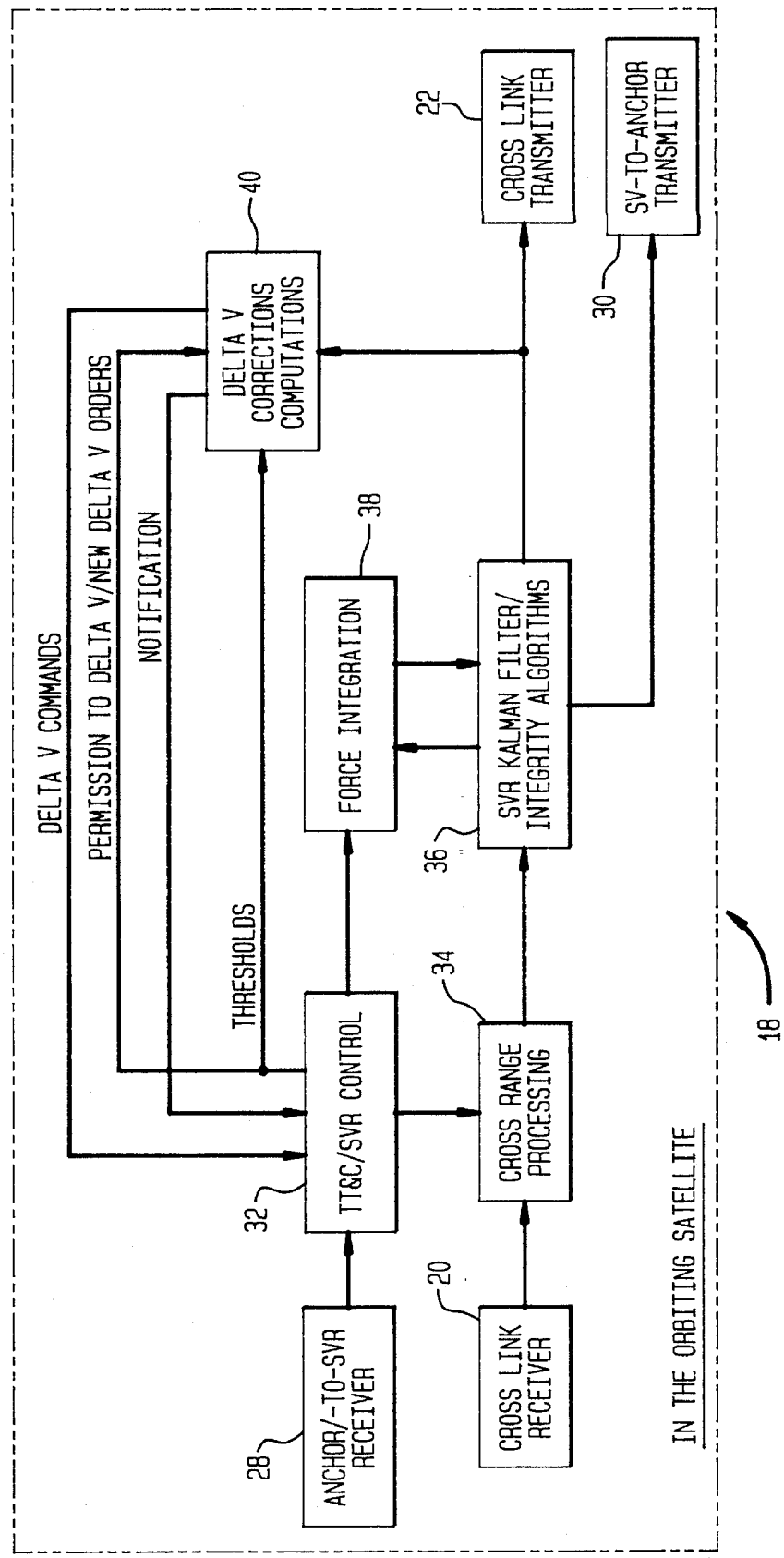
FIG. 3A is a block diagram of the invention, showing the elements of the invention that are a part of the anchor.

Referring to FIG. 3A in conjunction with FIG. 3B, there is shown a block diagram of an illustrative embodiment of the present invention. Depicted in FIG. 3 is an anchor 16, an orbiting satellite 18, and the functional elements of each. Although only a single satellite is shown in the figure, the invention would typically be used in systems comprising more than one satellite. Accordingly, the embodiment depicted in FIG. 3A and FIG. 3B will be described as it applies to systems comprising one or more satellites.

The orbiting satellite 18 of FIG. 3B is equipped with a crosslink receiver 20 for receiving autonomous navigation data from broadcasting satellites (not shown), and a crosslink transmitter for broadcasting its own autonomous navigation message. The anchor 16 is treated as merely another satellite having autonomous navigation capability and, as such, it is designed to communicate with the orbiting satellites in the crosslink format. One way to carry out crosslink communications between the anchor 16 and the orbiting satellite 18 would be to equip the anchor 16 with a transmitter and a receiver both operating at the crosslink frequencies used for inter-satellite communications. In the alternative, the anchor may be equipped with a transmitter and a receiver which operate at frequencies other than the crosslink frequencies perhaps to reduce signal degradations associated with using the crosslink frequencies to communicate through the earth's atmosphere. It is this alternative configuration that is shown in FIG. 3A and FIG. 3B. The anchor 16 is equipped with a transmitter 24 and a receiver 26, operating at any desired frequencies. Correspondingly, the satellite 18 is equipped with an anchor to satellite receiver 28 and a satellite to anchor transmitter 30, both operating at the respective frequencies used in the anchor transmitter 24 and receiver 26. While the frequency of the anchor—satellite communications may differ from the crosslink frequency, the content of the anchor—satellite communications can remain true to the autonomous navigation format.

The autonomous navigation message sent from the anchor and received by the satellite 18 is passed from a satellite receiver 28 to a telemetry, tracking, and command block (TT & C) 32. The functions of the TT & C block 32 include: decoding information received from the anchor 16, communicating decoded information to the other functional elements located in the satellite 18, and managing out delta-v maneuvers. The decoded autonomous navigation message may contain ephemerous, clock, and Kalman Filter data, all of which are relayed by the TT & C block 32 to a cross range processing block 34.

The cross range processing block 34 prepares the decoded ephemerous, clock, and Kalman Filter data for processing in the satellite's Kalman Filter. It extracts the cross range between the anchor 16 and the satellite 18, the difference in time between the anchor's clock and its own clock (delta time), the anchor's estimated ephemerous data, and the anchor's Kalman Filter covariance matrix. This extracted data is then passed to the Satellite's Kalman Filter, represented in FIG. 3A by a Satellite Kalman Filter/Integrity Algorithms block (Kalman Filter block) 36.

The Kalman Filter block 36 implements a Kalman process to update the satellite's stored values of its ephemerous parameters and of the on-board clock time. The Filter makes use of the cross range measurement, and an estimated cross range measurement, as computed from the anchor's ephemerous parameters and the satellite's ephemerous parameters. The Filter also makes use of the anchor's covariance matrix and its own covariance matrix to compute the Kalman Filter gains and a new covariance matrix. The residues (the difference between the measurement and estimated values) from the Filter are used as a measure of the health of the satellite 18 and may be used to trigger a command to take the satellite 18 off line.

Included in the Kalman Filter block 36 is data received from a force integration block 38. The force integration block 38 allows the satellite to reduce the position determination error associated with the various gravitational forces acting on the satellite. Between receptions over the crosslink receiver 20 and anchor to satellite receiver 28, the accuracy of the predicted satellite position is degraded by variations in the satellites orbit caused by the gravitational influences of the earth, moon, sun, and planets. The force integration block 38 estimates the effect that the relative position of these celestial bodies will have on the satellite and then adjusts the satellite's position determination accordingly. Thus, the satellite position that is passed to the Kalman Filter block 36 is a corrected position, taking into account the effect of gravitational forces on the satellite.

When the Kalman Filtering operation is complete the updated ephemerous and clock parameters are passed to the crosslink transmitter 22 and the satellite to anchor transmitter 30 for broadcast to other orbiting satellites and to the anchor, respectively. The Filter output is also passed to a delta-v correction computations block (delta-v block) 40. The delta-v block uses the filter output, in conjunction with data received from the TT & C block 32, to determine whether or not a delta-v maneuver is needed to correct the satellite's 18 orbit. The delta-v block 40 will determine that a delta-v maneuver is needed when the satellite strays from its orbit far enough that the difference between the satellite's ideal orbit and its actual orbit exceeds a threshold, the threshold being passed to the delta-v block 40 from the TT & C block 32. Upon a determination that a delta-v maneuver is needed, the delta-v block 40 will compute the necessary delta-v command values, such as the selection of maneuvering rockets that will be fired and the duration of the firing of those rockets. Once the delta-v values are computed, the delta-v block 40 notifies the TT & C block 32 of the delta-v command. The notification is sent to the control segment (not shown) for approval, disapproval, or modification. The control segment approval, disapproval, or modification is relayed to the delta-v block 40 via the TT & C block 32 and appropriate action is taken. If the delta-v is approved, the delta-v block 40 issues a command to the TT & C block 32 to fire the rockets. If the delta-v is modified, the rockets are fired in accordance with the modified command. If the delta-v is disapproved, no further action is taken by the TT & C block 32. If, however, the control segment does not respond to the delta-v notification for a predefined period of time, then the control segment is assumed to be non-operational and the delta-v maneuver is initiated without anchor approval. Alternatively, the delta-v command computed in the delta-v block 40 is compared to the delta-v command sent to the delta-v block 40 via the TT & C block 32 from the control segment. If a large disparity exists then the delta-v block 40 via the TT & C block 32 requests confirmation before initiating the delta-v command.

Normal anchor processing includes computing a Kalman Filter solution for the anchor 16 in the same manner that a standard GPS receiver Kalman Filter solution is generated. The anchor Kalman processing is handled by a compute anchor position and constellation time block (anchor processing block) 42. The output of the anchor processing block 42 is the Kalman Filter solution for anchor position and satellite clock time. The anchor position, as computed by the anchor processing block 42, is then modified for range and error to a satellite and transmitted as part of the anchor's autonomous navigation message. The satellite clock time, generated by block 42, however, is not transmitted as part of the anchor's autonomous navigation message. This satellite clock time first passes through a clock correction block 44. The clock correction block 44 computes a corrected clock value based on the difference between the satellite clock time and UTC time, as received from the US Naval Observatory (represented in the figure by a US Naval Observatory block 46). In practice, the corrected clock value does not have to be based on UTC time from the US Naval Observatory—any desired time reference may be used. Regardless of the time reference that is used, the corrected clock value is substituted for the satellite clock time in the autonomous navigation message before that message is sent to the anchor to satellite transmitter 24. In this manner the orbiting satellite's clock can be locked to the time reference.

By incorporating the functional blocks described in FIG. 3A and FIG. 3B into the design of a satellite system, or by modifying an existing satellite system to perform the functions represented by the blocks, both types of systems may realize the advantages of the present invention. One existing satellite system that could benefit substantially from the advantages of the present invention is the Global Positioning System (GPS). For this reason a preferred embodiment of the invention is the invention as it is integrated into the GPS.

Figure 4A:
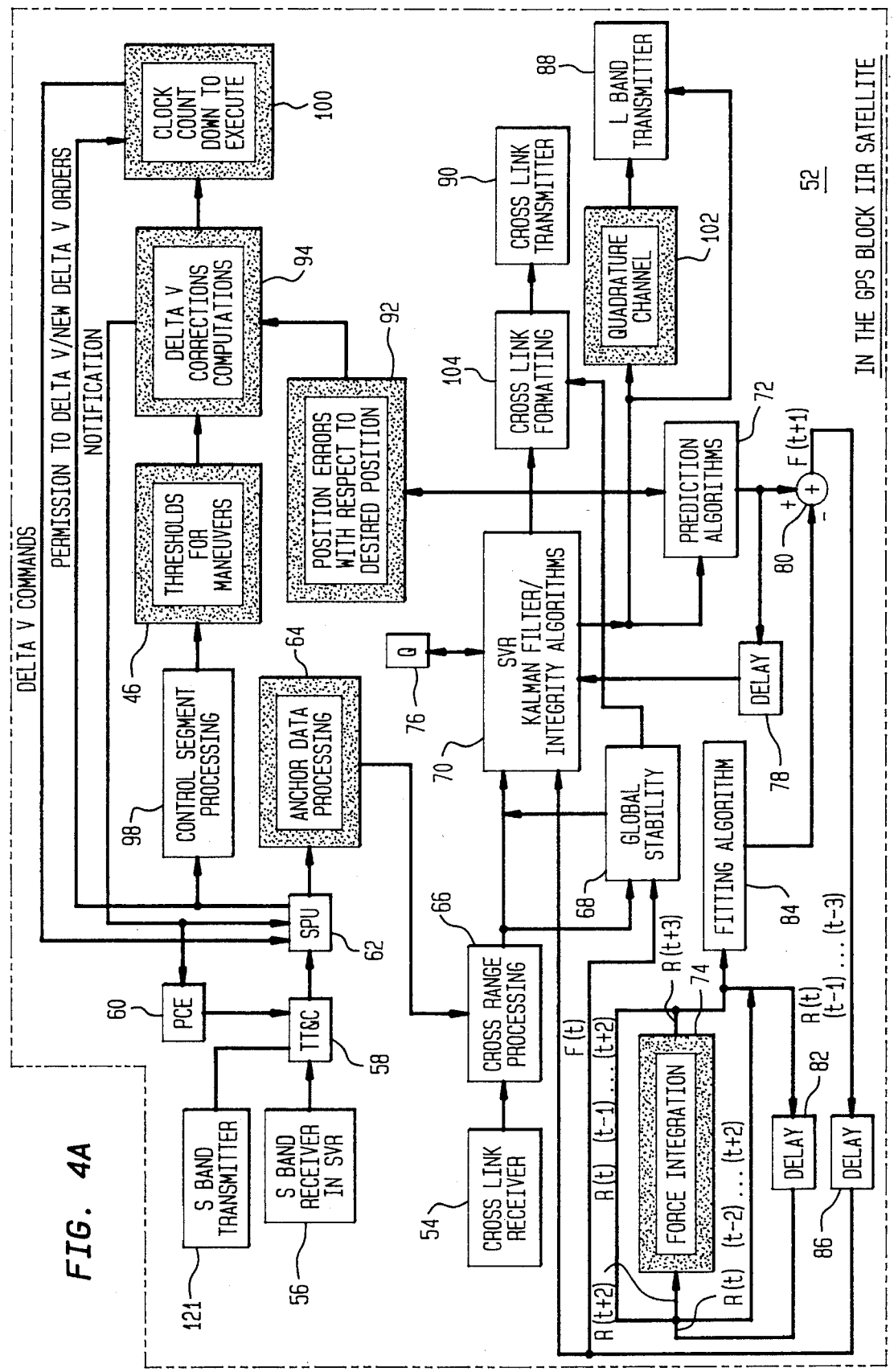
FIG. 4A is a block diagram of the invention as it would be employed in the GPS satellite(s)
Figure 4B:
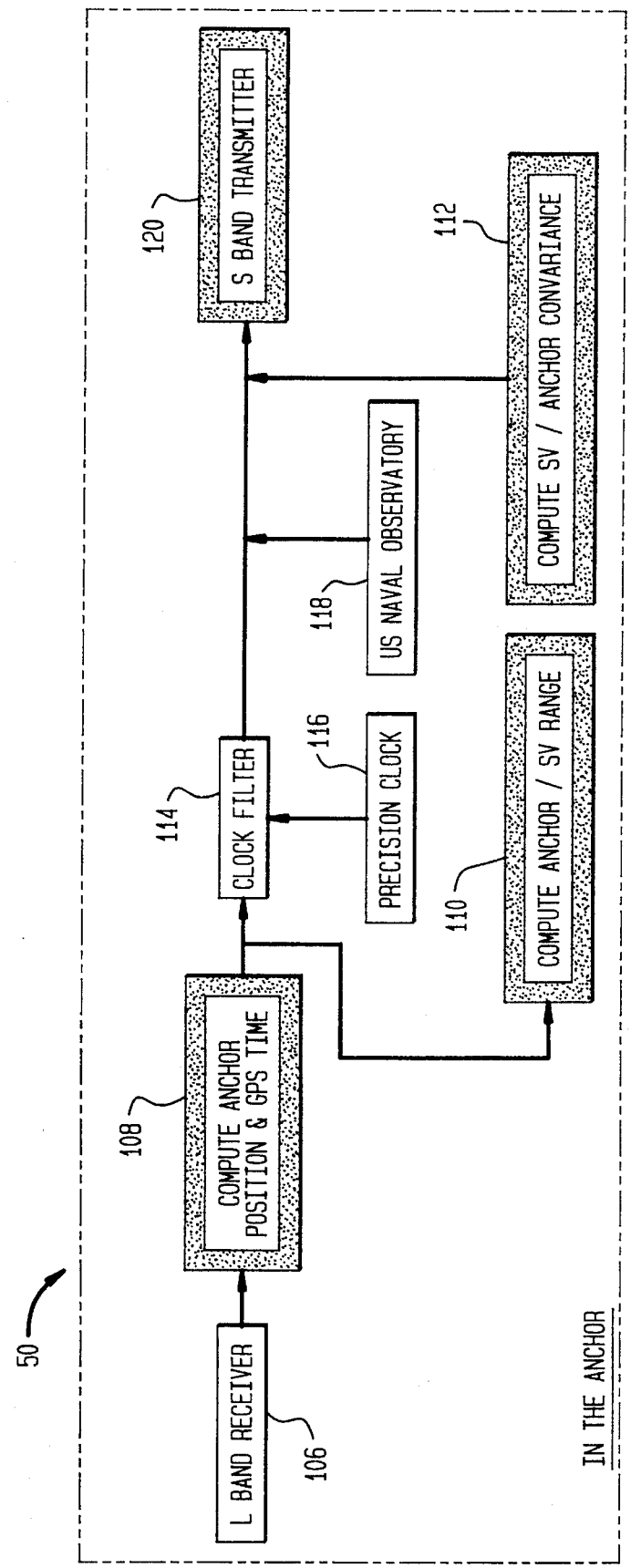
FIG. 4B is a block diagram of the invention as it would be employed in the anchor.

Referring now to FIG. 4A in conjunction with FIG. 4B, there is shown the present invention as used in the GPS. The shaded blocks in the figure represent functions that are not performed in the GPS as the system is currently configured. The remaining blocks represent functions that are currently performed in the GPS, although some software modifications may be necessary to these blocks in order to make them work with the current invention. Those skilled in the art of the invention will readily understand where such modifications are warranted, as well as the manner and means of achieving such modifications.

An anchor 50, and a GPS Block IIR satellite 52, and the functional blocks of each are shown in FIG. 4A and FIG. 4B. The Block IIR satellite 52 is equipped with a cross link receiver 54 and an S band receiver 56. These two receivers perform the same functions as their corresponding elements in FIG. 3A and FIG. 3B, namely, the cross link receiver 20 and the anchor to satellite receiver 28. In the GPS embodiment of FIG. 4A and FIG. 4B, communications from the anchor 50 to the satellite 52 are carried out at S band since this band allows for greater resistance to atmospheric interference with the communications. Moreover, S band is a currently available band for these communications. Autonomous navigation data is received by the satellite 50 over S band and is passed from the S band receiver 56 to a telemetry, tracking, and command block (TT & C) 58.

The TT & C block 58 decodes information received from the anchor 50 and then passes the decoded information to an SPU block 62. The SPU block 62 represents a computer that controls the satellite's housekeeping functions such as controlling the orbit through the satellite's maneuvering rockets. Data passed from the TT & C block 58 to the SPU 62 includes anchor to satellite range and time correction to be used in the Kalman Filtering operation, and any delta-v instructions that may have been requested by the satellite 52. In a process similar to that described in relation to the generic embodiment of FIG. 3A and FIG. 3B, notification of a delta-v maneuver is communicated to the control segment (not shown) via the TT & C block. In the GPS embodiment, this notice is formatted by a PCE block 60 which then passes the notification to the TT & C block 58 for eventual transmission to the control segment. Like the generic embodiment, the satellite 52 also computes a delta-v command which is implemented by the SPU 62 upon a go response from the control segment. In the current operational philosophy, a delta-v command from the control segment would be compared to a delta-v command generated in the delta-v block 94. If they are within limits, then the delta-v command would be implemented. If they were outside limits, then the delta-v block 94 would request verification from the control segment via the PCE Block 60 and the TT & C block 58. The cross range and time data that is decoded and sent to the SPU 62 is passed to an anchor data processing block 64. The anchor data processing block 64 places the cross range and time data into the appropriated computer program/storage locations for further processing by a cross range processing block 66.

The cross range processing block 66 prepares the data for Kalman processing. It extracts the cross range from the anchor 50 (or a broadcasting satellite) to the satellite 52, the delta time between the anchor's 50 (or a broadcasting satellite's) clock and the satellite's 52 clock, the anchor's 50 (or a broadcasting satellite's) estimated ephemerous data and filter covariance matrix. After extraction, the data is sent to a Global Stability block 68 that scales the average perceived error to insure that the distributed Kalman Filter functions in the total constellation will be stable. The data, as conditioned by the Global Stability block 68, is then passed to a Kalman Filter/Integrity Algorithms block (Kalman block) 70 for Kalman processing.

The Kalman block 70 performs functions substantially similar to the generic embodiment's Kalman block 36. It runs a Kalman Algorithm based on: received ephemerous data, passed to it by the Global Stability block 68; predicted ephemerous data, passed to it by a prediction algorithms block 72; force integration data, generated by a force integration block 74; and process noise data, supplied by a Q block 76. The prediction algorithms block 72 predicts the ephemerous parameters one updating period into the future to prepare for the next measuring and filter operation. Since the prediction based on the current Kalman Filter output is to be used in the next Kalman measurement, it is delayed by a delay block 78 before being fed back into the Kalman Filter block 70. The prediction is also added to force integration data by an adder 80. As in the generic embodiment, the force integration block 74 is utilized to account for the gravitational effects of celestial bodies on the orbiting satellite 52. The output of block 74 is sent to a fitting algorithm block 84 as well as being fed back into the block 74 through a delay block 82. The fitting algorithm block 84 performs a curve fit of the force integration data for combination with the predicted data by the adder 80. The combined prediction-force integration data is then delayed by a delay block 86 before being sent to the Global Stability 68 and Kalman Filter 70 blocks where it is used along with the most recently received broadcast data to generate a new position determination for the satellite 52.

The position determinations made by the Kalman Filter block 70 are used to generate new predictions of position; are used in the satellite 52 for on board delta-v processing; are transmitted to the anchor 50, and to GPS users, over an L band transmitter 88; and are broadcast to other orbiting satellites over a crosslink transmitter 90. The processes involved in generating new predictions of position are represented by a single block, the prediction algorithm block, while the delta-v processing, transmission, and broadcasting functions are each represented by a plurality of blocks.

In regard to delta-v processing, the output of the Kalman Filter block 70 is passed to a Position Errors With Respect To Desired Position (Position Errors) block 92. This block computes the difference between the desired position and the estimated position of the satellite 52 by comparing the desired position as determined by an orbital mode to the estimated position as determined by the Kalman Filter. The output of the Position Errors block 92 is passed to a delta-v Corrections Computations (delta-v) block 94. In the delta-v block 94 a decision is reached as to whether a delta-v maneuver is necessary. This decision is based on thresholds that are passed to the Delta-v block 94 from a Thresholds for Maneuvers (Thresholds) block 96. The Thresholds block 96 computes the threshold values based on data received by the SPU block 62 and stored in a Control Segment Processing block 98. If the difference between the desired and estimated satellite 52 position exceed a threshold that is stored in the Threshold block 96, then a delta-v maneuver is said to be necessary and the Delta-v block 94 will take appropriate action.

When a delta-v maneuver is necessary the Delta-v block will compute the values for the delta-v command and send these values to both the PCE block 60 and SPU block 62. The Delta-v block 94 also requests delta-v approval, disapproval, or modification from the control segment. This request is sent, along with the delta-v command values, to the PCE block 60 where both are formatted for transmission to the control segment. Notice of the request is sent from the Delta-v block 94 to the SPU block 62 and to a Clock Count Down to Execute (Count Down) block 100. Any approval or approval with modification of the delta-v command by the anchor 50 is relayed through the SPU block 62 to the Count Down block 100. If approval is received by the Count Down block 100, the block 100 issues a go ahead command to the SPU 62 which then implements the delta-v command by firing the satellite's rockets. If approval with modification is received, the block 100 issues the modified delta-V values and a go ahead command to the SPU 62. If disapproval is received, no further action is taken. If the anchor 50 fails to respond to delta-v requests for a predefined period of time, then the anchor 50 is assumed to be non-operational and delta-v commands are implemented without awaiting a response from the anchor 50. The satellite 52 to control segment communications associated with delta-v processing are conducted through the S-band transmitter 121 along with the other satellite 52 to control segment communications.

Alternatively, the delta-v command issued by the control segment is compared with the delta-v command computed in the delta-v block 94 and if a disparity exceeding a threshold exists, confirmation is requested from the control segment. This enhances the system integrity by helping to prevent an erroneous delta-v command from being implemented.

Satellite 52 to anchor 50 communications include the transmission of ephemerous data to GPS users. Based on the above described GPS configuration, the current position of the satellite 52 is transmitted to users along with the satellite's prediction of its position for the next four hours. The predicted data is provided so that GPS users have satellite 52 position data at their disposal during the period of time between satellite 52 position updates if data becomes unavailable. In a GPS employing the present invention, satellite 52 position updates occur more frequently (15 minutes or less). In order to take advantage of the more frequent updates a Quadrature Channel block 102 is added to the GPS. This block 102 encodes the satellite 52 to GPS users and to anchor 50 transmissions in a Quadrature Phase Shift Keying format to allow two separate information streams to be simultaneously transmitted by the L band transmitter 88. In this manner, GPS users possessing receivers adapted to the current GPS configuration can receive satellite 52 position updates in the old "four hour" format, while users possessing receivers adapted to the QPSK format could receive satellite 52 position in the new "15 minute" format. Thus, in a GPS employing the present invention. GPS receivers built to the current GPS specification would still be usable while new receivers could be built to take full advantage of the enhanced GPS capability.

The format of crosslink communications in the GPS embodiment of FIG. 4A will be unchanged from the current GPS format of crosslink communications. A Crosslink Formatting block 104 is provided. This block 104 formats the satellite's 52 crosslink data for transmission by the crosslink transmitter 90. The data will be transferred during its appropriate time slot in the time division multiplexed data transfer scheme.

Since communications from the satellite 52 to the anchor 50 are not transmitted over the crosslinks but are transmitted over the L band, an L band receiver 106 is provided in the anchor 50. The L band receptions are passed to a Compute Anchor Position and GPS Time block 108. The anchor 50 computes its position and the GPS time from the received data in the same way that a standard GPS receiver computes its position and the GPS time. The computed anchor 50 position, GPS time, and the received satellite 52 ephemerous data are passed from block 108 to a Compute Anchor to Satellite Range (Range) block 110. The Range block 110 computes the anchor 50 to satellite 52 range and passes this cross range, along with the anchor 50 position, and satellite 52 ephemerous data, to a Compute Satellite/Anchor Covariance (Covariance) block 112. The Covariance block 112 uses the data from the Range block 110 and the system error budgets to compute a covariance matrix. Through blocks 108, 110, and 112, the anchor 50 generates three of the four parameter values necessary to maintain the Kalman Process on the orbiting satellite 52, namely, anchor 50 position, anchor 50/satellite 52 crossrange, and satellite 52/anchor 50 covariance. The only remaining necessary parameter is a corrected GPS time.

The function of generating a corrected GPS time is distributed among three blocks: a Clock Filter block 114, a Precision Clock block 116, and a US Naval Observatory block 118. The Clock Filter block 114 has two inputs, GPS time (satellite 52 version), and time from a precision reference (represented by block 116). Based on these two inputs the Clock Filter 114 derives an estimate of the GPS time (constellation version). The GPS time that is output from the Clock Filter 114 is corrected to time from the US Naval Observatory—as represented by block 118—to generate a corrected GPS time for use in the satellite's 52 Kalman Process. After the four Kalman parameter values are finally computed by the anchor 50, they are passed to an S band transmitter 120 for transmission to the orbiting satellite 52; thereby completing the satellite 52 to anchor 50 processing loop.

The satellite's range error for the Kalman Filter is projected up to the line of sight between the satellite 52 and a computed anchor at a mean constellation radius directly above the anchor 50. This error is processed in the satellite's Kalman Filter block 70 to improve the geometry of the actual range measurement.

This detailed description discloses an apparatus and method for communicating with one or more orbiting satellites. Although an illustrative and a GPS embodiment of the invention have been described in detail it should be understood that various changes, alterations, and substitutions can be made to these embodiments without departing from the spirit of the invention. All such changes are intended to be included within the scope of the invention as defined in the appended claims.

We claim:

1. A system for carrying out communications between one or more earth-orbiting satellites and a fixed reference point, and for computing the position of said satellites with respect to said reference point, comprising:

an anchor of fixed position relative to the earth's surface having an anchor receiving means for receiving data and autonomous navigation messages transmitted from said satellites, wherein said anchor communicates with at least one of said satellites, said anchor including a time reference clock and including means for computing position determinations for each of said satellites with which communication is established relative to said anchor and for computing a satellite clock time, means for computing a corrected satellite clock value according to said time reference clock, and means for broadcasting said position determinations and said corrected satellite clock value to said satellites, said position determinations being periodically updated;

wherein each of said satellites includes means for receiving said autonomous navigation messages from other of said satellites and means for broadcasting said autonomous navigation messages to said other of said satellites.

2. The system according to claim 1, wherein, said means for computing said position determinations is a Kalman Filter algorithm, said Kalman Filter algorithm using said autonomous navigation messages broadcast by each of said satellites to derive a measured value and an estimated value for the position of each said satellite and operating on said measured values and said estimated values to arrive at said position determinations.

3. The system according to claim 1, wherein, each of said satellites further comprises means for computing position determinations for each of said satellites relative to one another, said position determinations being updated every time one of said autonomous navigation messages is received.

4. The system according to claim 3, wherein said means for computing position determinations is a Kalman Filter algorithm, said Kalman Filter algorithm using said autonomous navigation messages broadcast by each of said satellites to derive a measured value and an estimated value for the position of each said satellite and operating on said measured values and said estimated values to arrive at said position determinations.

5. The system according to claim 4, further comprising:

a first transmitter on board each of said satellites for transmitting said autonomous navigation messages from said satellites to said anchor, said first transmitter being an L band transmitter;

a first receiver for receiving at said anchor said autonomous navigation messages from said satellites, said first receiver being an L band receiver;

a second transmitter said for transmitting said position determinations from said anchor to said satellites, said second transmitter being an S band transmitter;

a second receiver on board each of said satellites for receiving at said satellites said position determinations transmitted from said anchor, said receiver being an S band receiver; and wherein:

said means for broadcasting said autonomous navigation messages to other of said satellites is a crosslink transmitter; and said means for receiving said autonomous navigation messages from other of said satellites is a crosslink receiver.

6. The system according to claim 3, further comprising:

a first transmitter on board each of said satellites for transmitting said autonomous navigation messages from said satellites to said anchor, said first transmitter being an L band transmitter;

a first receiver for receiving at said anchor said autonomous navigation messages from said satellites, said first receiver being an L band receiver;

a second transmitter said for transmitting said position determinations from said anchor to said satellites, said second transmitter being an S band transmitter; and a second receiver on board each of said satellites for receiving at said satellites said position determinations transmitted from said anchor, said second receiver being an S bend receiver; and wherein:

said means for broadcasting said autonomous navigation messages to other of said satellites is a crosslink transmitter; and said means for receiving said autonomous navigation messages from other of said satellites is a crosslink receiver.

7. The system according to claim 1, further comprising:

a first transmitter on board each of said satellites for transmitting said autonomous navigation messages from said satellites to said anchor;

a first receiver for receiving at said anchor said autonomous navigation messages from said satellites;

a second transmitter for transmitting said position determinations from said anchor to said satellites; and a second receiver on board each of said satellites for receiving at said satellites said position determinations transmitted from said anchor.

8. A method for carrying out communications between one or more earth-orbiting satellites and a point of fixed position relative to the earth's surface, and for computing the position of said satellites with respect to the earth, comprising the steps of:

providing an anchor of fixed position relative to the earth's surface;

broadcasting from each of said satellites an autonomous navigation message, each said message containing said satellite's determination of its own position;

receiving autonomous navigation broadcasts from each of said satellites at said anchor;

implementing a tracking algorithm at said anchor for computing a position determination of said orbiting satellites relative to the earth, wherein, said position determination is based on autonomous satellite navigation data and data available independently to said anchor;

broadcasting said position determinations to said satellites as part of an autonomous navigation message sent from said anchor;

implementing a tracking algorithm at each of said satellites that is substantially similar to the tracking algorithm implemented at said anchor, said tracking algorithm being used at each of said satellites to generate an updated satellite position determination; and broadcasting said updated satellite position determinations for reception by said anchor and said satellites.

9. The method according to claim 8, wherein, said tracking algorithm is a Kalman Filter algorithm, said Kalman Filtering algorithm deriving measured satellite and anchor positions from said autonomous navigation message, computing predicted satellite and anchor positions, and using said measured and predicted positions to arrive at a solution for satellite and anchor positions.

10. A system for carrying out communications between one or more earth-orbiting satellites and a point of fixed position relative to the earth's surface, and for computing the position of said satellites with respect to the earth, comprising:

transmitting means on board each of said satellites for transmitting data to said anchor and for transmitting data to other of said satellites;

an anchor having an anchor receiving means for receiving data from said satellites, a first processing means for computing a position determination for each of said satellites, and for computing a satellite clock time, a means for computing a corrected clock value by comparing said satellite clock time to a time reference, and an anchor transmitting means for transmitting said position determination and said corrected clock value to said satellites, said position determination being updated every time a transmission is received from one of said satellites;

receiving means on board each of said satellites for receiving transmissions from said anchor and for receiving transmissions from other of said satellites; and means on board each of said satellites for extracting position and time data received from said anchor and from other satellites, and for using said position and time data as input to a second processing means, said second processing means computing an on-board position determination for each of said satellites and for computing an on-board corrected clock value.

11. The system according to claim 10, further comprising:

means on board each of said satellites for using said on-board position determination to decide whether a delta-v manuever is necessary and to issue a delta-v command when said delta-v maneuver is decided to be necessary; and means on board each of said satellites for implementing said delta-v maneuver responsive to said delta-v command.

12. The system according to claim 11, further including:

means for transmitting said delta-v command to said anchor;

means for approving at said anchor of said delta-v command;

means for disapproving at said anchor of said delta-v command;

means, at said anchor, for modifying said delta-v command;

means, at said anchor, for communicating any of said approving, disapproving or modifying of said delta-v command to said satellite;

wherein said means for implementing said delta-v maneuver is responsive to said means for communicating at said anchor.

13. The system according to claim 12 further including;

means, on board said satellite, for comparing said modified delta-v command from said anchor with said delta-v command issued on board said satellite; and means on board said satellite for requesting confirmation, from said anchor, of said modified delta-v command if a predetermined difference between said on board issued command and said modified delta-v command is exceeded.

14. The system according to claim 10, further comprising means for encoding satellite to anchor transmissions in a Quadrature Phase Shift Keying format.

15. The system according to claim 10, further comprising means for determining the gravitational effects of celestial bodies on said satellites and incorporating said determination into said on-board position determination.

16. The system according to claim 10, wherein said first processing means is a Kalman Filter.

17. The system according to claim 10, wherein said second processing means is a Kalman Filter.

18. The system according to claim 10, wherein said first processing means and said second processing means are both Kalman Filters.

19. The system according to claim 18 wherein a satellite range error for said Kalman Filters is projected up to a line of sight between said satellite and a computed anchor position at a mean constellation radius;

wherein an error is processed in said Kalman Filters for improving the geometry of a range measurement between said anchor and said satellite.

20. The system according to claim 10, wherein:

said transmitting means on board each of said satellites for transmitting data to said anchor and for transmitting data to other of said satellites comprises an L band transmitter and a crosslink transmitter; and said receiving means on board each of said satellites for receiving transmissions from said anchor and for receiving transmissions from other of said satellites comprises an S band receiver and a crosslink receiver.

21. The system according to claim 10, wherein:

said anchor receiving means is an L band receiver; and said anchor transmitting means is an S band transmitter.

22. The system according to claim 10, wherein said time reference is the US Naval Observatory.

23. The system according to claim 10, further comprising:

means on board each of said satellites for using said on-board position determination to decide whether a delta-v maneuver is necessary;

means on board each of said satellites for implementing said delta-v maneuver;

means for encoding satellite to anchor transmissions in a Quadrature Phase Shift Keying format;

means for determining the gravitational effects of celestial bodies on said satellites and incorporating said determination into said on-board position determination;

wherein;

said first processing means and said second processing means are both Kalman Filters;

said transmitting means on board each of said satellites for transmitting data to said anchor and for transmitting data to other of said satellites comprises a first L band transmitter and a crosslink transmitter;

said receiving means on board each of said satellites for receiving transmissions from said anchor and for receiving transmissions from other of said satellites comprises a first S band receiver and a crosslink receiver;

said anchor receiving means is a second L band receiver;

said anchor transmitting means is a second S band transmitter; and said time reference is the US Naval Observatory.

* * * * *